(12) United States Patent
Kalthoff et al.

(10) Patent No.: US 7,236,973 B2
(45) Date of Patent: Jun. 26, 2007

(54) COLLABORATIVE MASTER DATA MANAGEMENT SYSTEM FOR IDENTIFYING SIMILAR OBJECTS INCLUDING IDENTICAL AND NON-IDENTICAL ATTRIBUTES

(75) Inventors: Wolfgang Kalthoff, Bad Schonbom (DE); Frank Rohloff, Sandhausen (DE); Markus Krabel, Oftersheim (DE)

(73) Assignee: SAP Aktiengesellschaft, Walldorf (DE)

( * ) Notice: Subject to any disclaimer, the term of this patent is extended or adjusted under 35 U.S.C. 154(b) by 750 days.

(21) Appl. No.: 10/367,102

(22) Filed: Feb. 13, 2003

(65) Prior Publication Data

US 2004/0103103 A1   May 27, 2004

Related U.S. Application Data (60) Provisional application No. 60/429,688, filed on Nov. 27, 2002.

(51) Int. Cl.
G06F 7/02 (2006.01)

(52) U.S. Cl. .......................... 707/6; 707/200
(58) Field of Classification Search ................ 709/206, 709/201, 223; 707/500, 3, 1, 203, 204, 201, 707/6, 200; 711/216
See application file for complete search history.

(56) References Cited

U.S. PATENT DOCUMENTS

| | | | |
|---|---|---|---|
| 4,459,663 A | 7/1984 | Dye | |
| 5,099,431 A | 3/1992 | Natarajan | |
| 5,191,534 A | 3/1993 | Orr et al. | |
| 5,311,424 A | 5/1994 | Mukherjee et al. | |
| 5,442,782 A | 8/1995 | Malatesta et al. | |
| 5,655,085 A | 8/1997 | Ryan et al. | |
| 5,694,598 A | 12/1997 | Durand et al. | |
| 5,703,938 A | 12/1997 | Lucas et al. | |
| 5,710,884 A | 1/1998 | Dedrick | |
| 5,758,031 A | 5/1998 | De Silva | |
| 5,859,972 A | 1/1999 | Subramaniam et al. | |
| 5,911,139 A | 6/1999 | Jain et al. | |
| 6,018,742 A | 1/2000 | Herbert, III | |
| 6,029,195 A | 2/2000 | Herz | |
| 6,032,147 A | 2/2000 | Williams et al. | |
| 6,067,525 A | 5/2000 | Johnson et al. | |
| 6,226,650 B1 | 5/2001 | Mahajan et al. | |

(Continued)

FOREIGN PATENT DOCUMENTS

CA    2391829    6/2001

(Continued)

OTHER PUBLICATIONS

Anonymous "Data Profiling the Foundation for Data Management" *DataFlux Corporation*, Jul. 1, 2004, pp. 1-17.

(Continued)

*Primary Examiner*—Le Hien Luu
(74) *Attorney, Agent, or Firm*—Fish & Richardson P.C.

(57) ABSTRACT

Methods and apparatus, including computer program products, for sharing data. The technique includes receiving data in a central system from one or more client systems, performing a matching process on objects of data in the central system to determine if there are similar objects in the central system, mapping object identifications of similar objects to each other if there are similar objects in the central module, and providing the object mapping information to a process.

34 Claims, 7 Drawing Sheets

U.S. PATENT DOCUMENTS

| | | | |
|---|---|---|---|
| 6,236,997 | B1 | 5/2001 | Bodamer et al. |
| 6,324,647 | B1 | 11/2001 | Bowman-Amuah |
| 6,330,598 | B1 * | 12/2001 | Beckwith et al. ............ 709/223 |
| 6,405,132 | B1 | 6/2002 | Breed et al. |
| 6,480,755 | B1 | 11/2002 | Ootani et al. |
| 6,487,594 | B1 | 11/2002 | Bahlmann |
| 6,529,948 | B1 | 3/2003 | Bowman-Amuah |
| 6,567,818 | B1 | 5/2003 | Frey et al. |
| 6,711,456 | B2 | 3/2004 | Yokomori et al. |
| 6,718,361 | B1 | 4/2004 | Basani et al. |
| 6,738,682 | B1 | 5/2004 | Pasadyn |
| 6,754,666 | B1 | 6/2004 | Brookler et al. |
| 6,768,944 | B2 | 7/2004 | Breed et al. |
| 6,842,881 | B2 | 1/2005 | Croke et al. |
| 6,857,123 | B1 | 2/2005 | Nuxoll et al. |
| 6,895,408 | B1 | 5/2005 | Kavantzas |
| 6,915,287 | B1 | 7/2005 | Felsted et al. |
| 7,103,605 | B1 | 9/2006 | Hazi et al. |
| 2002/0065892 | A1 * | 5/2002 | Malik .......................... 709/206 |
| 2002/0073114 | A1 * | 6/2002 | Nicastro et al. ............ 707/500 |
| 2002/0087510 | A1 | 7/2002 | Weinberg et al. |
| 2002/0095454 | A1 | 7/2002 | Reed et al. |
| 2002/0116417 | A1 | 8/2002 | Weinberg et al. |
| 2002/0124005 | A1 | 9/2002 | Matson et al. |
| 2002/0128904 | A1 | 9/2002 | Carruthers et al. |
| 2002/0156688 | A1 | 10/2002 | Horn et al. |
| 2002/0161778 | A1 | 10/2002 | Linstedt |
| 2002/0184308 | A1 | 12/2002 | Levy et al. |
| 2002/0194196 | A1 | 12/2002 | Weinberg et al. |
| 2003/0018878 | A1 * | 1/2003 | Dorward et al. ............ 711/216 |
| 2003/0028519 | A1 * | 2/2003 | Burgess ......................... 707/1 |
| 2003/0135495 | A1 * | 7/2003 | Vagnozzi ....................... 707/3 |
| 2003/0191832 | A1 | 10/2003 | Ramakrishna et al. |
| 2003/0233347 | A1 | 12/2003 | Weinberg et al. |
| 2004/0015408 | A1 | 1/2004 | Rauen, IV et al. |
| 2005/0038551 | A1 | 2/2005 | Mazumder et al. |
| 2006/0064456 | A1 * | 3/2006 | Kalthoff et al. ............. 709/201 |

FOREIGN PATENT DOCUMENTS

| | | |
|---|---|---|
| DE | 10049940 A1 | 4/2002 |
| WO | WO 01/37097 | 5/2001 |
| WO | WO 02/25500 | 3/2002 |
| WO | WO 02/47463 | 6/2002 |
| WO | WO 02/25471 | 3/2003 |
| WO | 03/093998 | 11/2003 |

OTHER PUBLICATIONS

Garcia et al. "Immunization Registries DeDuplication and Record Matching," *White Paper*, 1999, pp. 1-11.

Georgakopoulos et al. "An Overview of Workflow Management: From Process Modeling to Workflow Automation Infrastructure," *Distributed and Parallel Databases*, 1995, vol. 3, No. 2, pp. 119-153.

Rahm et al. "Data Cleaning: Problems and Current Approaches," *Quarterly Bulletin of the Computer Society of the IEEE Technical Committee on Data Engineering*, Dec. 2000, pp. 1-11.

U.S. Appl. No. 09/577,268, filed May 2000, Hazi et al.

U.S. Appl. No. 09/643,207, filed Aug. 2000, Brookler et al.

U.S. Appl. No. 09/643,316, filed Aug. 2000, Brookler et al.

Haerder T. et al., "Integritaetskontrolle," Datenbanken Konzepte und Techniken Der Implementierung, 1999, pp. 397-405, XP002294581 [translation provided].

Haerder T. et al., "RX-Serrverfahren," Datenbanken Konzepte und Techniken Der Implementierung, 1999, pp. 419-420, XP002294552 [translation provided].

Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.

Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatik.uni-leipzig.de:80/pub/2000-45, XP002284896, 11 pgs.

"SyneML Protocol, version 1.0," Internet Citation, Dec. 7, 2000, XP002217356, 60 pgs.

Bertino, Elisa, et al., "Data Security," Proceedings of the Twenty-Second Annual International computer Software and Applications Conference, Vienna, Austria, Aug. 19-21, 1998, Los Alamitos, CA, USA, Aug. 19, 1998, (CompSAC '98), XP010305455, pp. 228-237.

bon, M., et al., "Sharing Product Data Among Heterogeneous Workflow Environments," CAD 2002: Corporate Engineering Research, German Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5th ACM Workshop on role-Based Access Control, Berlin, Germany, Jul. 26-27, 2000 XP000958089, pp. 11-18.

Choi, Jin Oh, et al., "Update Propagation of Replicated Data in Distributed Spatial Databases," Proceedings of Database and Expert Systems Applications: Tenth International Conference, Florence, Italy, Aug. 30, 1999—Sep. 2, 1999, DEXA '99 (Lecture Notes in Computer Science vol. 1677), Berlin, Germany, Springer-Verlag, Germany, XP009022583, pp. 952-963.

Chou, H-T. et al., "Versions and Change Notification in an Object-Oriented Database System", Proceedings of the Design Automation Conference, Anaheim, Jun. 12-15, 1988, Proceedings of the Design Automation Conference (DAC), New York, IEEE, US, vol. CONF. 25, Jun. 12, 1988, pp. 275-281, XP010013006, ISBN: 0-8186-0864-1.

Ferreira Rezende, Fernando de, et al., "A Lock Method for KBMSs using Abstraction Relationships' Semantics, " Proceedings of the International Conference on Information and Knowledge Management, CIKM, ACM, New York, NY, USA, 1994, XP002943684, pp. 112-121.

hong, B. et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita, T. et al., "A Database Architecture and Version Control for Group Work", System Sciences, 1994, vol. III: Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Rana, S.P. et al., "Version Support for Manufacturing Database Systems", International Conference on Industrial & Engineering Applications of Artificial Intelligence & Expert Systems, Tullahoma, IN, US, New York, NY, US, vol. 2, Jun. 6, 1989, pp. 779-784, XP000605772.

Berntsson et al., Task Sharing Among Agents Using Reactive Rules, Cooperative Operation Systems, 1997. COOPIS '97., Proceedings of the Second IFCIS International, Jun. 24-27, 1997, pp. 56-65.

Hill et al., "Data Transformation: Key to Information Sharing" Gartner Group Strategic Analysis Report, Sep. 29, 1998, pp. 1-60.

Chan and Suwanda, "Designing Multinational Online Stores: Challenges, Implementation Techniques and Experience", *IBM Centre for Advanced Studies Conference: Proceedings of the 2000 conference of the Centre for Advanced Studies on Collaborative research*, Mississauga, Ontario, Canada, 2000, pp. 1-14.

Shethand Larson, "Federated Database Systems for Managing Distributed, Heterogeneous, and Antonomous Databases", *ACM Computing Surveys*, 1990, 22(3): 184-236.

* cited by examiner

COLLABORATIVE MASTER DATA MANAGEMENT SYSTEM FOR IDENTIFYING SIMILAR OBJECTS INCLUDING IDENTICAL AND NON-IDENTICAL ATTRIBUTES

CROSS-REFERENCE TO RELATED APPLICATIONS

This application claims priority based on U.S. Provisional Patent Application No. 60/429,688 for "Dynamic Data Access," filed on Nov. 27, 2002, the disclosure of which is incorporated here by reference in its entirety.

BACKGROUND

The present invention relates to data processing and to data management systems.

Information technology ("IT") environments can consist of many different systems performing processes, such as business processes, on common master data. The different systems can be part of the same entity or can be part of different entities, such as vendors or contractors. The master data used for the processes can be stored in a number of different locations, systems, and/or incompatible formats. Branch offices of a company can work largely independently, adopted companies can introduce new software solutions to a group of affiliated companies, systems from different vendors can be linked. Different master data models can make it difficult to integrate business processes in these scenarios.

Master data can become trapped and siloed in different systems. Master data that is not aligned across an IT environment can lead to data redundancies and irrelevant or incorrect information. For example, if two local branches of the an international company each have the same local branch of a second international company as a business partner, each international business partner can be maintained twice, with no correlation between the two "business partner" master data objects. This can result in high costs for redundant multiple content maintenance. Further, business analytics performed with redundant or obsolete information can result in poor business decisions. In the above example, a company-wide analytic process can fail to detect the correlation between the "two" partners, and business value that could be leveraged out of recognizing these business partners as international business partners with two local branches would be lost.

SUMMARY OF THE INVENTION

The present invention provides methods and apparatus, including computer program products, for sharing data.

In general, in one aspect, the invention features methods and apparatus, including computer program products, for sharing data. The technique includes receiving data in a central system from one or more client systems, performing a matching process on objects of data in the central system to determine if there are similar objects in the central system, mapping object identifications of similar objects to each other if there are similar objects in the central module, and providing the object mapping information to a process.

The invention can be implemented to include one or more of the following advantageous features. A matching process can be performed on objects of data in the central system to determine if there are identical objects in the central system, and object identifications of identical objects can be mapped to each other if there are identical objects in the central module.

The data can be cleansed to standardize the content of the data. Providing the object mapping information to a process can include providing the object mapping information to a data warehouse for system-wide reporting. Analysis can be performed based on the mapping information. A determination can be made whether identical objects are duplicate objects from the same client system, and duplicate objects can be removed from at least one of the central system and the client system from which the duplicate objects are received.

Performing a matching process can include identifying attributes of the objects in the central system, and comparing the attributes of the objects to determine if the objects are identical. Object information can be stored in the central system, where the object information includes global attributes of objects and object mapping information for each object. The object information can be based on the received data or created in the central system. The objects can be distributed with object mapping information to the one or more client systems. The matching process can be continuously performed on object information stored in the central system. The object information stored in the central system can be continuously updated based on data received from the one or more client systems.

Continuously updating the object information can include updating mapping information for each object. Objects can be created in the central system to include global attributes for the object. Distributing the objects can include distributing the global attributes for each object, and the technique can further include completing object information for at least one object in one of the one or more client systems.

The data objects can be mapped according to industry specific standards. A framework can be distributed to configure client system software to receive data objects from the central system.

In general, in one aspect, the invention features a system for sharing data. The system includes one or more client systems storing master data for use in processes performed in the client systems, and a central module configured to receive master data in a central system from the one or more client systems, perform a matching process on objects of the master data in the central system to determine if there are identical or similar objects in the central system, map object identifications of identical objects to each other if there are identical objects in the central module, map object identifications of similar objects to each other if there are similar objects in the central module, and provide the object mapping information to a process.

The invention can be implemented to include one or more of the following advantageous features. The central module can be further configured to remove duplicate objects from the one or more client systems and/or provide the object mapping information to a data warehouse for use in the process. The system can also include a data warehouse configured to receive the object mapping information to use in the process.

The invention can be implemented to realize one or more of the following advantages. A collaborative master data management system for master data allows centralized management of master data. Mappings between identical and similar objects allows improved cross-group reporting. Identification of duplicates allows avoidance of data redundancies. The collaborative master data management system enables consistent business processes through distribution of master data and mapping information to all clients. Also, cross company reporting is enabled, the resources related to maintenance of data can be reduced, and master data can be aligned across systems and companies.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
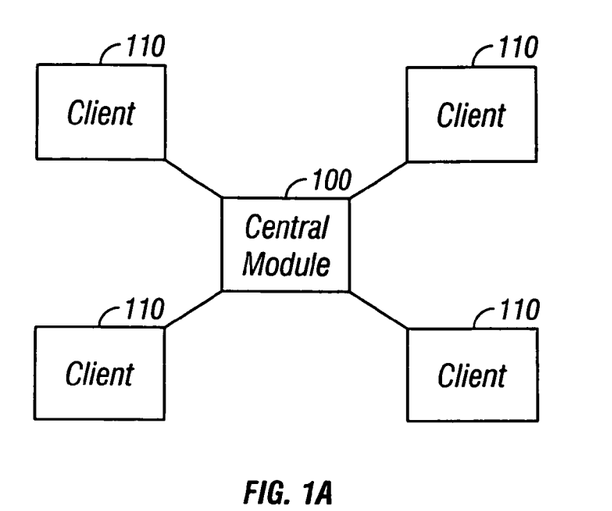
FIGS. 1A and 1B are block diagrams illustrating a collaborative master data management system.

As shown in FIG. 1A, a collaborative master data management ("cMDM") system includes a central module 100 and one or more client modules 110. Each client module 110 is linked directly to the central module 100.

The central module 100 can include a central system representing a centralized control of data management for an entity, such as a business or an organization. The client modules 110 can include systems or groups performing processes on master data. For example, the client modules 110 can include systems and/or groups involved in a product creation process. In this example, the client modules 110 can include a legacy module, an e-procurement module, an e-sales module, a sourcing module, a collaborative engineering module, a manufacturing module and enterprise resource planning ("ERP") modules.

The master data can be stored in the client module 110, in the central module 100 or in both, depending on the implementation. The central module 100 allows the master data used by each client 110 to include master data that is shared by all clients 110. Traditionally, client modules 110 would communicate directly with each other in a point to point architecture. For example, a manufacturing module might need to share master data with an e-procurement module, an e-sales module and a collaborative engineering module, among others. In traditional systems, the manufacturing module would receive data from or transmit data to the appropriate module, which could lead to inconsistency in data or the use of obsolete data, if data is not updated in the module transmitting the data for sharing. In the system described with reference to FIGS. 1A and 1B, data is managed through the central module 100. The central module 100 ensures consistent master data, and the distribution of the master data.

Figure 1B:
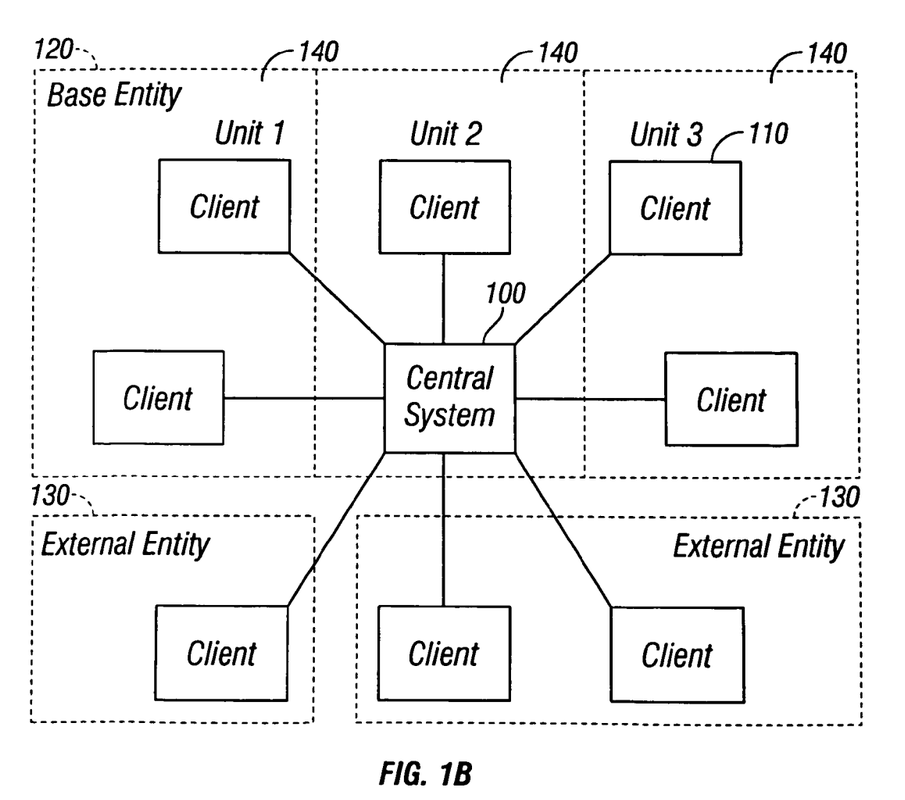

As shown in FIG. 1B, the cMDM system can be implemented to be used across a plurality of entities 120, 130. The central module 100 can be part of a base entity 120. The client systems 110 can be part of the base entity 120 or part of an external entity 130. For example, the base entity 120 can include an enterprise including client modules 110 for ERP, legacy, e-procurement and e-sales. The base entity can be divided into units 140, where each unit can include one or more clients 110. The external entities 130 can include a contractor including a client 110 for manufacturing and a supplier including clients 110 for collaborative engineering and sourcing.

In another example, the base entity 120 can include a customer service entity while an external entity 130 can include an enterprise. Customer information that may normally be dispersed over multiple client modules 110 can be consolidated through central system 100.

The centrally managed master data can be used for processes such as cross-group reporting, data integration for mergers and acquisitions, reducing the diversity of parts, supporting product maintenance, simplification of customer management, and supporting catalogs such as through merging catalog contents and bundling of purchasing activities into a smaller number of vendors. The cMDM system can also support versioning and change management. As versions are created or changes made, the data for the versions or changed data can be managed through central module 100, as described below.

A setup of a cMDM system can be performed before data is exchanged between the cMDM system and client modules 110. Identification attributes are specified for master data objects and rules for matching are established. The setup of attributes and rules for matching can be performed with regard to the entity using the cMDM system, or with regard to the object needs in general. A matching process performed on master data objects received from client modules can be used to manage the master data objects.

Specifying attributes can include matching different objects from different client applications or different client modules 110. Specifying attributes can also include linking elements of the matched structures together so that master data objects received from different client systems can be compared.

The specified attributes can also be ranked during setup. The ranking of attributes can be used during a matching process to determine whether two master data objects are identical. Thus, if an attribute that is ranked higher doesn't match between two objects, it is more likely that they are not identical or similar than if an attribute ranked lower on the list does not match.

The cMDM system can be implemented in at least three different scenarios, as described with reference to FIGS. 2–7. The scenarios can be implemented separately or introduced in an evolutionary manner, by starting with a content consolidation scenario and moving to a master data harmonization scenario or moving from a master data harmonization scenario to a central master data management scenario. The different scenarios can also be used together. For example, central master data management can be used for some object types while master data harmonization is used for the rest. The mixing of the scenarios will be discussed in more detail below.

Content Consolidation

Figure 2:
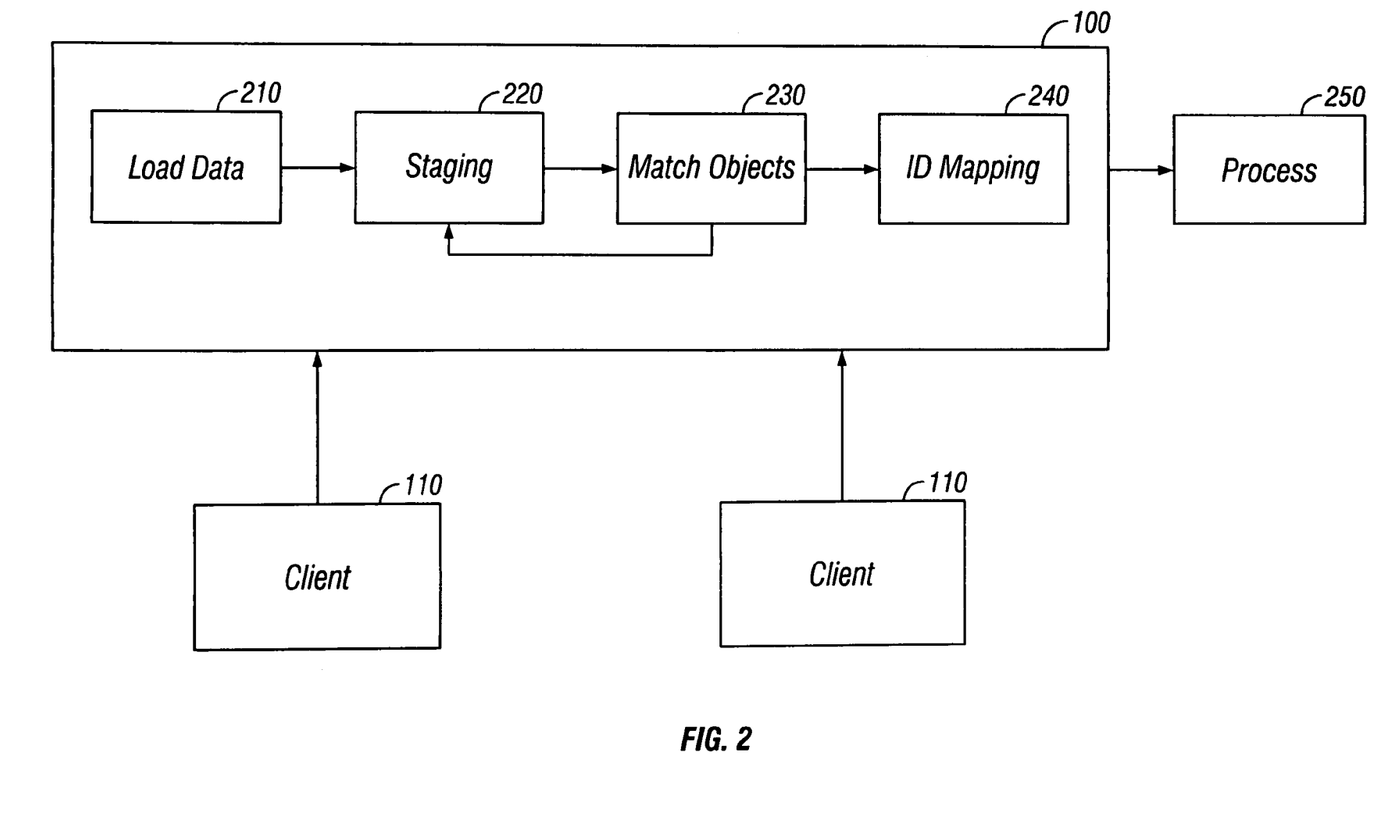
FIG. 2 is a block diagram illustrating a content consolidation implementation of a collaborative master data management system.

FIG. 2 is a block diagram illustrating a content consolidation scenario for a cMDM system. Central module 100 can include a load module 210, a staging module 220, a match module 230 and an ID mapping module 240. The consolidated content resulting from the processes performed in central module 100 can be used in processes 250 such as business analysis, (e.g., global spending analysis) or creation of central catalogs (e.g., a supplier product catalog).

At load module 210, master data objects are received into the central module 100. Master data objects are uploaded into central module 100 in the form in which they were maintained in their local applications (client modules 110). At staging module 220, a user at the central module 100 can determine if the master data objects are loaded correctly. For example, the user can check the content of the master data object loaded in load module 210 to make sure that the content of the master data object is correct. The master data objects can be cleansed in the staging module 220 to standardize the content of the master data objects. For example, if the standard format for abbreviating New York is "NY," and one of an input master data object has the abbreviation as "N.Y.," the content of the input master data object can be changed to "NY" by removing the periods in between the "N" and the "Y." Data cleansing can also include removing mistakes and inconsistencies to make data more accurate.

The staging module 220 can also be used as an intermediate storage for received master data objects for a master data client. The intermediate storage can be used while processing matching and mapping routines described below with respect to match module 230 and mapping module 240, respectively. The intermediate storage can also be used during individual user interaction before upload of master data objects.

Matching processes can also be completed in the staging module 220. The master data objects are forwarded to a match module 230. If the match module 230 does not automatically match the master data objects based on the identified attributes, the master data objects can be returned to the staging module for manually deciding whether the master data objects match.

At match module 230, a matching process can be performed on the uploaded master data to identify identical or similar data objects. Identical data objects are master data objects that are semantically identical, and which are received from different client modules 110. Identical data objects can have two different object IDs. Duplicate data objects are semantically identical master data objects within the same system, such as a client module 110. Possible duplicates are recognized automatically and reported. One or more of the duplicate data objects can be removed from the client system.

The matching process includes recognizing similarity between master data objects. The matching process can include identifying attributes of the data objects and comparing the attributes. The attributes that are compared can include attributes that are valid entity-wide for master data object types, so that identical and similar data objects can be recognized, although the content of the attributes can differ from system to system. Thus, different data formats and structures can be retained in different systems.

If the amount of match between two master data object is within a certain range, the results of the matching process may be considered to be unresolved. For example, if two master data objects match 50–80%, the results of the matching process can be considered unresolved. For example, if a master data object to be matched is a business partner, and four of five attributes match another business partner master data object, the amount of match would be 80%. Thus, the issue of whether the two objects match can be considered to be unresolved. The master data object can be returned to the staging module for an user to manually determine if the master data object matches another master data object.

The mapping module 240 receives the results of the matching process from the match module 230. At mapping module 240, the similar or identical objects can be mapped to each other. For example, an object identification ("ID") of one object can be mapped to an object ID of a similar or identical object. The mapping information can be updated each time a change is made to a data object. The mapping can be performed automatically based on rules established during set up of the master data management system. The mapping can be stored in a mapping table. The mapping information can change based on changes made to a master data object. For example, if "N.Y." in master data object A is changed to "NY," master data objects that were not mapped to master data object A can now be considered identical to master data object A and master data objects that were mapped to master data object A will need to be changed. Thus, changes can be managed through mapping information and updates to mapping information by making the mapping information available to client modules 10. Similarly, when a new version consisting of a group of data objects is defined, mapping information and updates to the mapping information can be used to manage the version.

The mapping information can be provided to process module 250. Process module 250 can include complex analytics, including a data warehouse, such as a business information warehouse, for system-wide reporting. The processes performed in process module 250 can include creation of a central catalog or company-wide analysis and reporting, such as global spend analysis or mergers and acquisitions.

Figure 3:
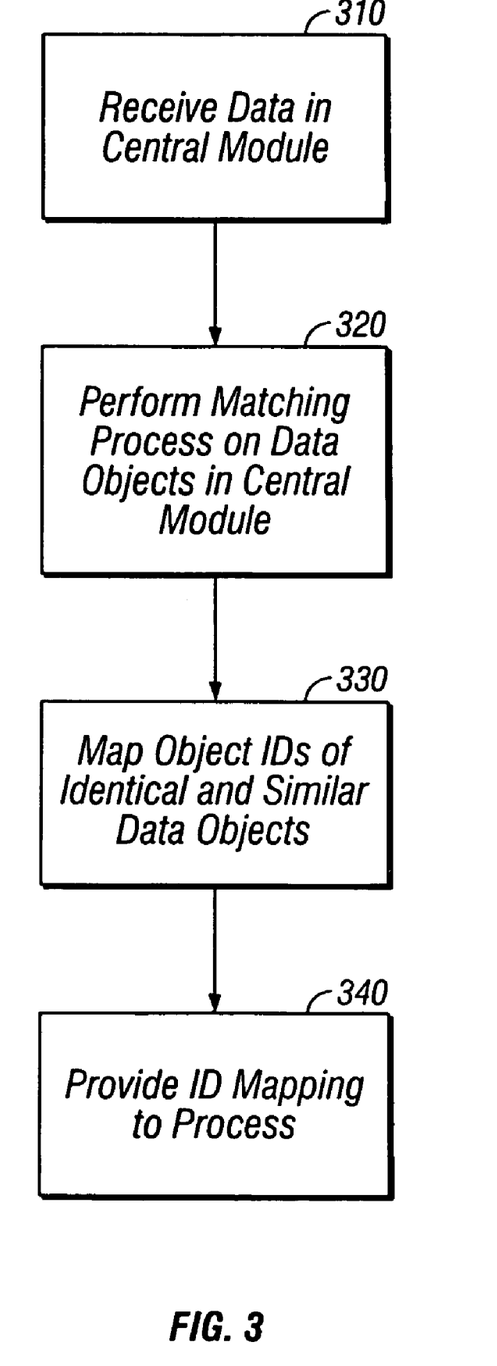
FIG. 3 is a flow diagram illustrating a method for consolidating data.

FIG. 3 is a flow diagram illustrating a method for consolidating data. Data is received into central module 100 from one or more client modules 110. (Step 310) If the received data content is not aligned with content of a central system in central module 100, the received data can be cleansed.

A matching process is performed on objects of data in the central system to determine if there are identical or similar objects in the central system. (Step 320) The matching process can include comparing identifying attributes of the objects. The matching process can also include identifying duplicates. If two or more objects are found to be duplicate objects, one or more of the duplicate objects can be avoided from being entered into the central module. The duplicate master data objects can be transferred to the staging module 220, where one of the duplicate master data objects is removed from the central module 100. The cMDM can also support removal of one or more of the duplicate master data objects from the system from which the duplicate objects were received.

If identical or similar objects are found, the central module can perform a mapping process. (Step 330) Object IDs of identical objects can be mapped to each other, and object IDs of similar objects can be mapped to each other. The object mapping information can be provided to a process. (Step 340) As discussed above, providing the mapping information to a process can include providing the mapping information to a data warehouse, such as a business information warehouse, for use in system-wide analysis and reporting. The mapping information can also be provided to the client modules 110.

Master Data Harmonization

Figure 4:
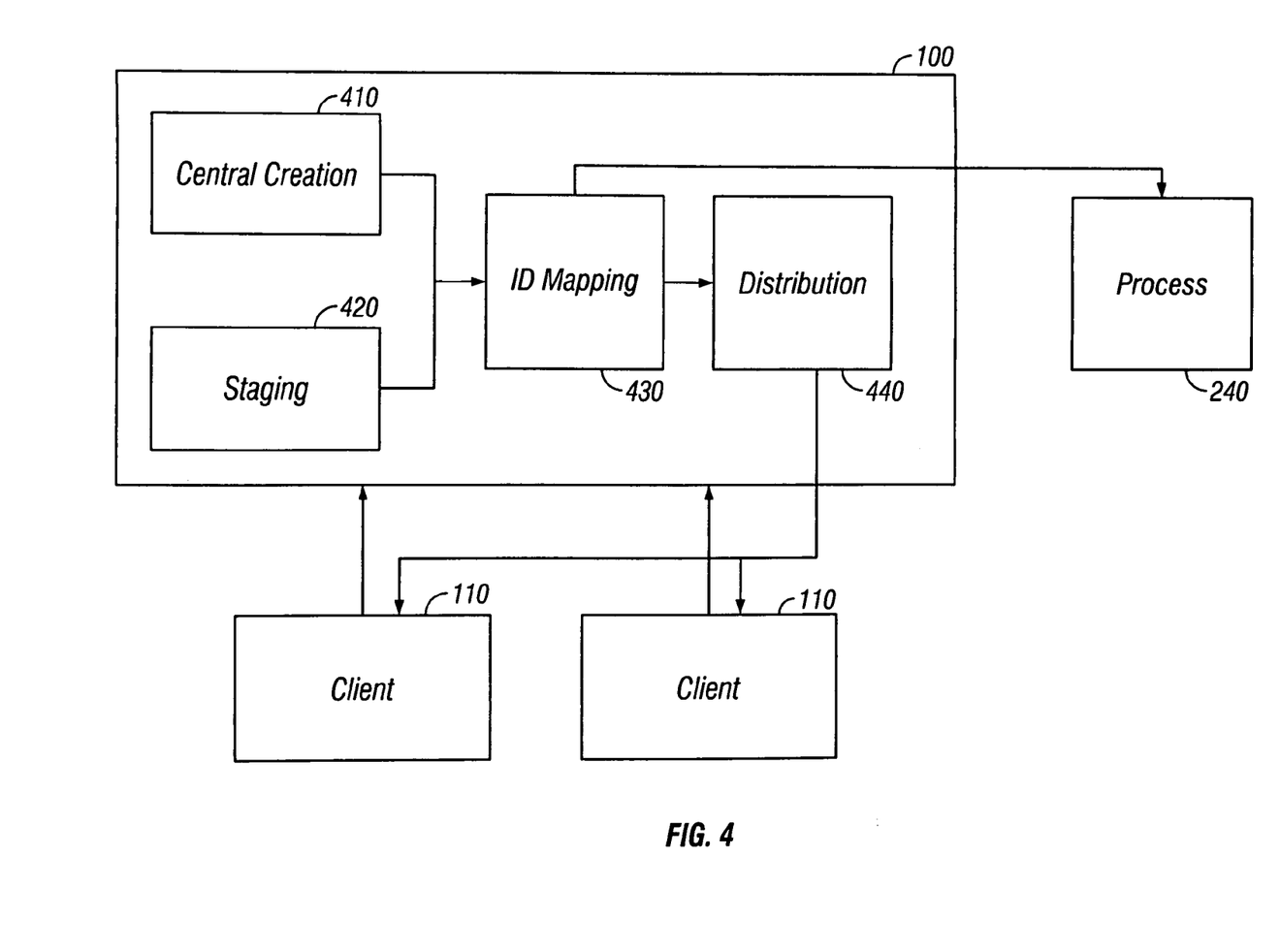
FIG. 4 is a block diagram illustrating a master data harmonization implementation of a collaborative master data management system.

FIG. 4 is a block diagram illustrating a second scenario for cMDM. The second scenario includes a master data harmonization implementation. This scenario can be implemented by adding master data storage to a content consolidation implementation. This scenario can be used to enable the maintenance and consistent distribution of global attributes of the master data. The harmonized content resulting from the processes performed in central module 100 can be distributed to client modules 110 and process module 240 to be used in applications such as, for example, business partner administration, central provision of sales articles, definition and administration of non-variable parts.

The master data objects can be created in the central module 100, in central creation module 410, or in client modules 110. Master data objects created in client modules 110 are received in staging module 420. Portions of the master data objects and the mappings between master data objects can be stored in the central module 100. The portions of the master data objects stored can include global attributes of the master data objects.

Master data objects created in central creation module 410 can be created to include only global attributes of the master data object. Global attributes can include the identifying attributes. Which attribute is to be maintained for each object type can be dependent on information requirements and the system landscape. A framework can be added to the cMDM to enlarge an object model without doing any modification of the software used to create the master data object in the local system. The framework can deal with new issues and new fields. For example, the object description (data model for an object) can be tailored to a central instance. For example, fields may exist in data models in one system that do not exist in data models for another system. The framework can also support updating user interfaces for client systems receiving master data objects having different attribute fields. After distribution of the objects, as discussed below, the distributed objects can be provided with additional attribute values in the client modules 110.

Locally created master data objects can be created using the local application of the client 110. Client modules 110 can distribute the global attributes of the locally created master data objects into staging module 420. A cross system search can be made for the master data object before it is created in the client module 110. The master data object is created if no similar master data object exists. If a similar master data object does exist, central module 100 makes the similar master data objects available to the user at the client module 110. For example, the central module 100 can make similar master data objects available to the user at a client module 110 through a server. Thus, the similar master data object can be transferred to a server in the central module 100 and then transmitted to a client system at a client module 110.

The user can subscribe to the similar master data object, and mapping information can be updated to include the new local system. If no similar object is found, after creation of the master data object, the created master data object can be transmitted to other target systems.

Continuous matching processes can be performed in matching and mapping module 430. For example, mapping can be performed in response to a request to create a master data object in central creation module 410. The continuous matching processes can be used to identify identical and similar data objects. The identical and similar data objects can be mapped to each other, as described above.

Duplicate objects identified by the matching process can be avoided from being created in local systems. For example, if a local system requests a master data object for a new business partner, a user at the central module 100 can check to see if the business partner master data object already exists in the central module 100. If the business partner master data object does exist in the central module, the master data object can be distributed to the client system requesting the new master data object. If the user recognizes that the existing business partner master data object already exists in the target system, creation of a duplicate master data object is avoided. Mapping information can be provided to process module 240 for processes such as business-wide analysis.

The global attributes of the master data objects, including mapping information, can be distributed to the various client modules 110 through distribution module 440. Thus, all systems are supplied with the same global attributes after distribution, and business processes can be processed securely. Objects that logically belong together can be changed and distributed together. For example, when the master data include master data for a product, the objects that belong to the product, such as product structures and documents, can be collected together in a packet and then, distributed in one context to a recipient client module 110. A packet can include a group of individual objects that are linked through relationships including dependencies, such as objects in a product structure. A packet can be collected according to information requirements of the recipient client module 110, and can be transferred in a certain sequence.

For example, if a BOM changes or is to be distributed to a target system, rules associated with mappings for some specified systems can indicate that product masters for materials have to be transferred to a specified system before the BOM so that the specified system can recognize the product ID for the materials. Thus, sequencing of objects to distribute can be enabled to comply with semantics and requirements of target systems.

Client modules 110 can complete master data information for the received master data objects in the local environment. Changes to the master data can also be managed centrally in central module 100. The changes can be received, approved, and then, distributed to client modules 110.

Master data created in central module 100 can be created in response to a request from a client module 110. For example, a business user at a client module 110, using a client system, can fill out a request form for a new product master and transmit the form to a user at central system in a central module 100. Forms can be checked to ensure that the forms are correctly filled. For example, the forms can be checked semantically or units of measurement can be checked to ensure the correct units are used. The user at the central system can view and accept the request. The user at the central system can then check for duplicates, complete the given information, and then, create and distribute the new product master.

Figure 5A:
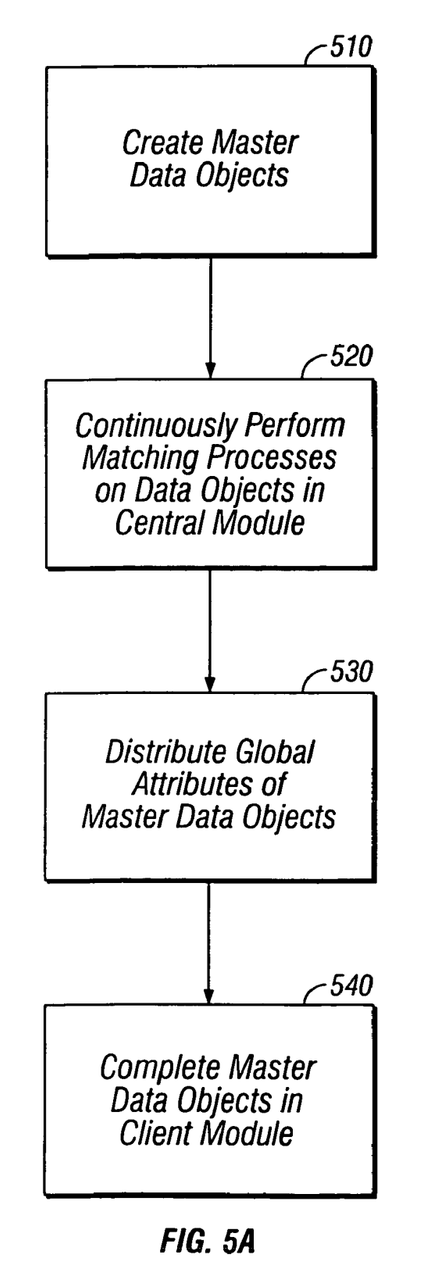
FIGS. 5A and 5B are flow diagrams illustrating a method for master data harmonization.
Figure 5B:
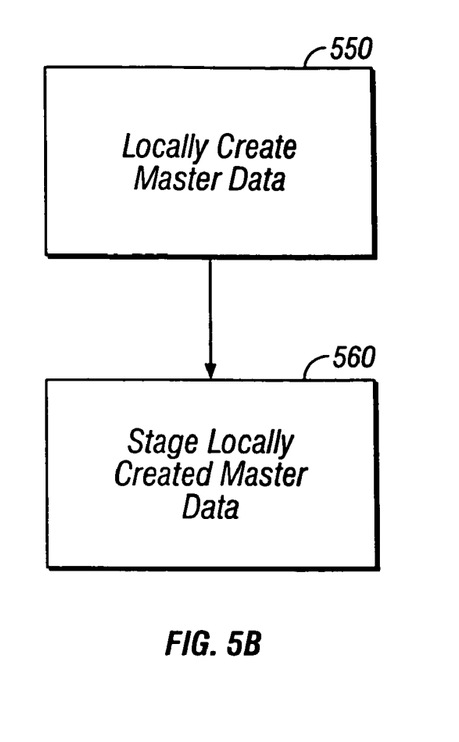

FIGS. 5A and 5B are flow diagrams illustrating methods for master data harmonization. Referring to FIGS. 1A, 1B, 4 and 5A, master data harmonization can include the creation of master data objects in the central module 100 as well as the client modules 110. (Step 510)

The master data objects can be created in three ways in master data harmonization. A new master data object can be created in the central module 100 directly or a new master data object can be created in the central module 100 in response to a request from a client module 110. A master data object can also be created locally in a client module 110 and transferred to a staging module 420. Master data created locally, in client modules 110 can be uploaded to central module 100.

The created objects can be stored in central module 100. The master data objects stored in central module 100 can include global attributes of the master data objects.

Continuous matching processes can be performed on the stored master data objects. (Step 520) The continuous matching processes can be used to identify duplicate, identical and similar data objects. Duplicate objects found can be removed, and object IDs of identical and similar objects can be mapped.

Master data object information, including global attributes of the master data objects and mapping information, can be distributed to the client modules 110. (Step 530) The master data information for the master data objects received in the client systems can be completed in the client modules 110. (Step 540)

FIG. 5B illustrates a method of master data harmonization where the master data is created locally, as discussed above. A master data object is created locally. (Step 550). The locally created master data object is staged. (Step 560).

Central Master Data Management

Figure 6:
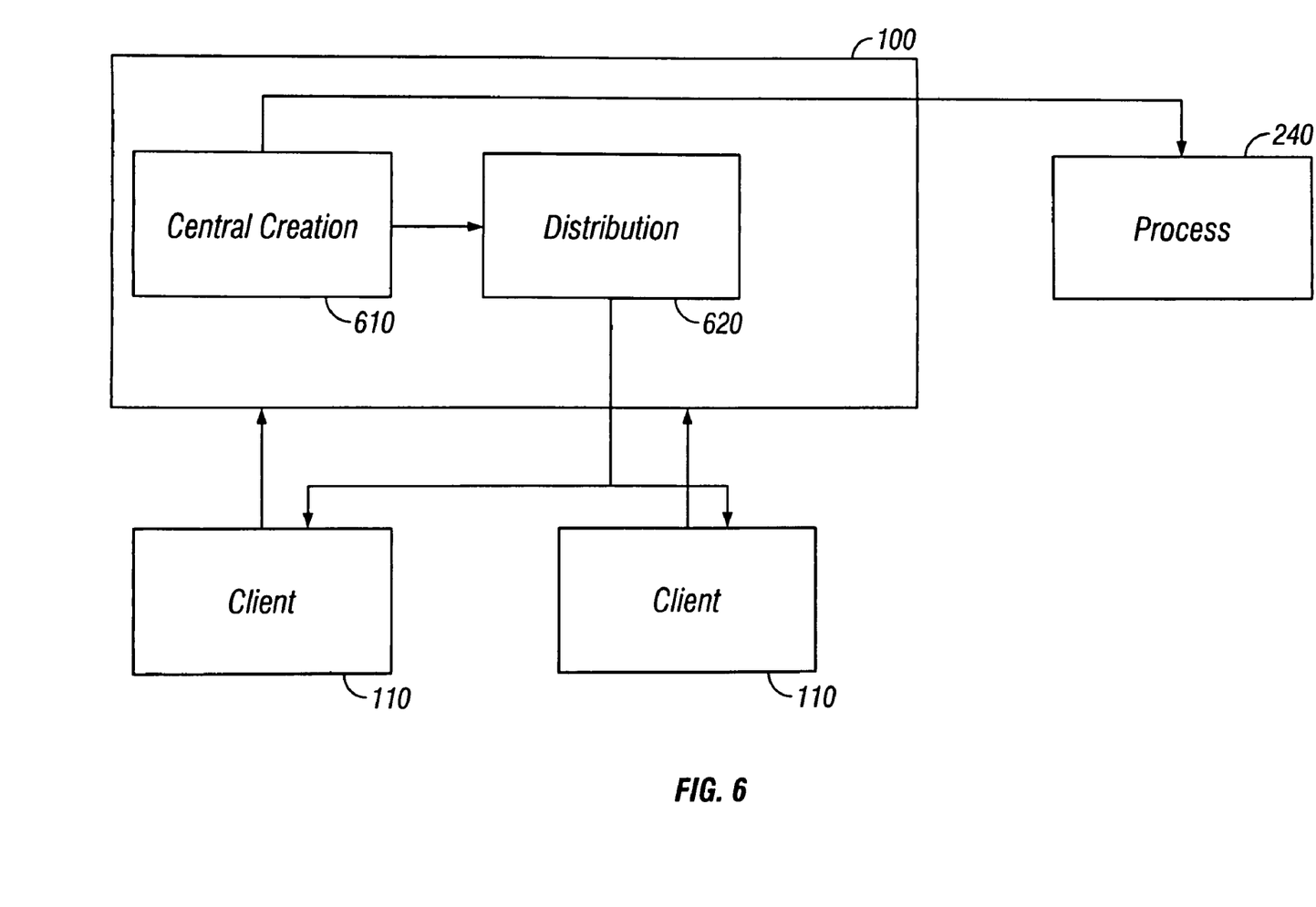
FIG. 6 is a block diagram illustrating a central master data management implementation of implementation of a collaborative master data management system.

FIG. 6 is a block diagram illustrating a central master data management implementation of a cMDM system. In the central master data management scenario, master data is controlled completely in the central module. In this implementation, all master data information resides centrally in central module 100. This implementation can be used for applications such as a central product data pool supplying product data to multiple locations for production, assembly, sales and distribution.

At central creation module 610, master data objects can be created. The created master data objects can include complete object information including complete object definition, object mapping information and object dependencies. The master data objects can be created in response to a request from a client module 110. Matching processes can be performed in response to the request, and mapping information can be included in the data object information stored in the central module 100. If identical objects exist in the central module 100, the requesting client module 110 can be notified that an identical object exists, and a new master data object is not created or mapped to an existing object. The mapping information can be updated.

At distribution module 620, the centrally maintained master data information can be distributed as individual objects as they are defined in the client modules 110. The objects can be distributed in packets. Objects that belong together can be changed and distributed together. If the master data includes product model master data, the objects that belong together, such as products, BOMs (bills of material), and documents, are collected together in a consistent packet and distributed together. The objects can be collected according to information requirements of the recipient client module 110. For example, the objects can be collected in reference to a particular view for a product. A view can include product relevant attributes, such as purchasing dates. Thus, a group of objects can be linked according to usage or location. For example a sales view can include attributes or content of objects that are related to or used by a sales department.

As discussed above, the scenarios can be used together. For example, central master data management can be used for business partner master data objects, where all of the business partner master data object information is maintained in central module 100. The central module 100 can store only global attributes for the rest of the data objects, such as product master data objects.

Figure 7:
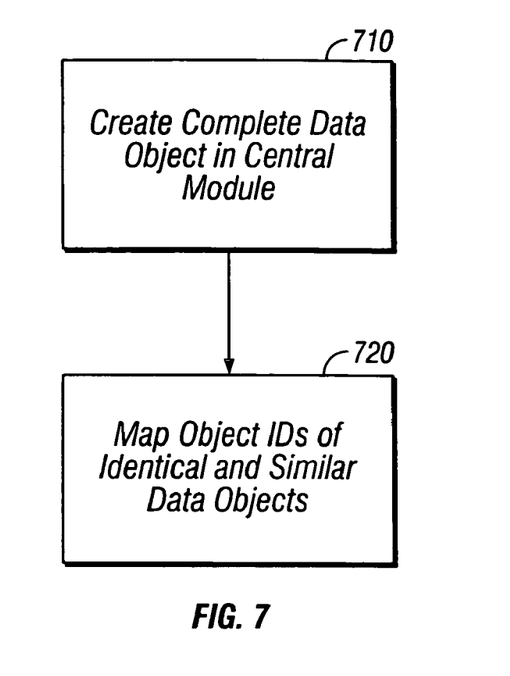
FIG. 7 is a flow diagram illustrating a method for central master data management.

FIG. 7 is a flow diagram illustrating a method for central master data management. The central master data management process can be performed in a homogeneous environment. Referring to FIGS. 1A, 1B, and 6, at least one data object is created in a central module 100 (step 710). The central module 100 can include a central system for a cMDM system. Central module 100 can store complete data object information which can be distributed to client modules 110. Thus, the created data object can include complete object information including a complete object definition, mapping information mapping the data object to other objects, and dependencies to other objects.

The data object can be created in response to receiving a request from a client module 110 to create the data object. A matching process can be performed on the request to determine if a similar or identical data object exists in the central system. If a similar or identical data object is found, the identical data object will be distributed to the requesting system and the distributed object will be mapped automatically.

Data objects from the central system can be distributed to one or more client modules 110. (Step 720) Distributing the data objects can include distributing the data objects to client modules 110. The data objects can be distributed in packets. The packets can be defined in the central module 100 based on requirements information received from a recipient client module 110.

The method of central master data management can also include performing changes to data objects and updating the data objects stored in the central module 100 based on the changes received. The updated data objects can be distributed to the client modules 110.

Master Data Management System

Figure 8:
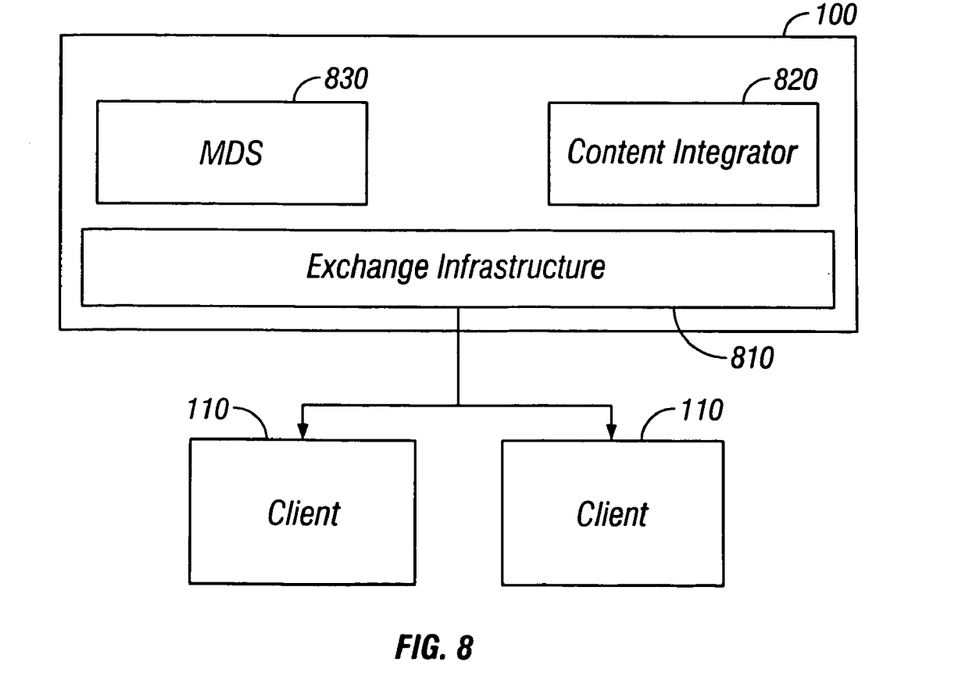
FIG. 8 is a block diagram illustrating a collaborative master data management module.

FIG. 8 is a block diagram illustrating a simplified structure of a central module 100. Central module 100 can include an exchange infrastructure ("XI") 810, a content integrator ("CI") 820, and a master data server ("MDS") 830. The XI 810 can be used for communication between client modules 110 and central module 100.

Master data that is to be distributed is received in XI 810. Distribution can be performed in three different ways, including subscription based distribution, historic distribution and content based distribution. A routing model (not shown) stores information about which systems are interested in the master data. The master data is then sent from the XI 810 to the relevant systems. Queuing can be used to ensure consistent messaging across the XI 810. Messages can be sent in XML (extensible markup language) format between the systems.

CI 820 can correlate master data from different systems by defining identifying attributes for each object. The identifying attributes are fed to CI 820 from different systems in client modules 110 and scanned for analogousness according to predefined rules. The CI 820 saves an object ID for objects in the system landscape, no matter to which system they belong, or to which data model they are subject. Master data objects that are stored in client modules 110 retain the identification defined in the respective client systems storing the master data objects. CT 820 understands that the respective instantiation relates to some other object in the system (using the mapping function). Thus, CI 820 performs the matching processes and preparation of the resulting ID mappings.

In one example, mapping can be done using industry specific standards. Different industries such as Chemicals, Consumer Products("CP")/Retail and so on, define standards of how an object should be described for their requirements. In one industry, for example, in CP it can be sufficient to describe a product name, description and a class (e.g. 'SWEETS'), while in Chemicals only the class is not sufficient. Thus, attributes and their values are used to describe the chemicals sufficiently. Thus, the attributes can be like a language for an industry. Therefore, the mapping of a MDM standard-xml format to industry specific standards is supported. Industry specific standards include, for example, CIDEX, Pidx, RosettaNet, Pricat.

CI 820 use the mappings for a double checking process for creating objects. The central module 100 receives a request to create a master data object. The CT 820 checks the request for identical objects. If no match is found, the central module generates a new object. The CI 820 then performs a check for the new object. If no match is found, then the central module stores the new master data object. Thus, even if the first check is incomplete based on the description provided by the client module 110, a match may be found when the object is completely created.

Merge strategies can be used to combine two or more objects that are found to be similar or identical. For example, if a master data object for a pump is produced in a purchasing system, a sales system and a production system, one object can be created in central module 100 by merging the three master data objects. For example, a new object can be created where different systems have authorizations for different parts of the object. Thus, a purchasing system can maintain purchasing information for the master data object. Although the purchasing system can view sales and production information, the purchasing system can be given authorization only to maintain the purchasing information.

MDS 830 can include a central data store for storing data objects. MDS 830 can perform the processes of object creation and change. MDS 830 can also provide services for change management, such as unified versioning, and status management. Grouping of changed objects into packets for distribution can also be performed in MDS 830.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method of sharing data, comprising:
   receiving data in a central system from one or more client systems;
   performing a matching process on objects of data in the central system to identify similar objects in the central system, the similar objects including at least one identical attribute and at least one non-identical attribute;
   mapping object identifications of the similar objects to each other; and providing object mapping information to a process for managing the objects, the object mapping information including the object identifications of the similar objects.

2. The method of claim 1, further comprising:
performing a matching process on objects of data in the central system to identify identical objects in the central system; and
mapping object identifications of the identical objects to each other.

3. The method of claim 1, further comprising:
cleansing the data to standardize content of the data.

4. The method of claim 1, wherein providing the object mapping information to a process includes providing the object mapping information to a data warehouse for system-wide reporting.

5. The method of claim 1, further comprising:
performing analysis based on the object mapping information.

6. The method of claim 2, further comprising:
determining that the identical objects are duplicate objects from a same client system; and
removing duplicate objects from at least one of the central system and the one or more client systems.

7. The method of claim 1, wherein performing a matching process includes identifying attributes of the objects in the central system, and comparing the attributes of the objects to determine if the objects are similar.

8. The method of claim 1, further comprising:
storing object information in the central system, the object information including global attributes of objects and object mapping information for each object, the object information being based on the received data or created in the central system; and
distributing the objects with object mapping information to the one or more client systems.

9. The method of claim 8, further comprising:
performing the matching process on object information stored in the central system, the matching process being performed multiple times.

10. The method of claim 8, further comprising:
updating the object information stored in the central system based on data received from the one or more client systems.

11. The method of claim 10, wherein updating the object information includes updating object mapping information for each object.

12. The method of claim 8, further comprising:
creating objects in the central system to include global attributes for the object.

13. The method of claim 8, wherein distributing the objects includes distributing the global attributes for each object, the method further comprising:
completing object information for at least one object in one of the one or more client systems.

14. The method of claim 1, further comprising:
mapping the data objects according to industry specific standards.

15. The method of claim 1, further comprising:
distributing a framework to configure client system software to receive data objects from the central system.

16. A system for sharing data, comprising:
one or more client systems for storing master data for use in processes performed in the client systems; and
a central module configured to:
receive master data in a central system from the one or more client systems;
perform a matching process on objects of the master data in the central system to identify similar objects in the central system, the similar objects including at least one identical attribute and at least one non-identical attribute;
map object identifications of the similar objects to each other, the similar objects being non-identical; and
provide object mapping information to a process for managing the objects, the object mapping information including the object identifications of the similar objects.

17. The system of claim 16, wherein the central module is further configured to remove duplicate objects from the one or more client systems.

18. The system of claim 16, wherein the central module is further configured to provide the object mapping information to a data warehouse for use in the process.

19. The system of claim 16, further comprising a data warehouse configured to receive the object mapping information to use in the process.

20. A computer program product, tangibly stored on a computer-readable medium, the computer program product comprising instructions operable to cause one or more programmable processors to:
receive data in a central system from one or more client systems;
perform a matching process on objects of data in the central system to identify similar objects in the central system, the similar objects including at least one identical attribute and at least one non-identical attribute;
map object identifications of the similar objects to each other; and
providing object mapping information to a process for managing the objects, the object mapping information including the object identifications of the similar objects.

21. The computer program product of claim 20, further comprising instructions operable to cause the one or more programmable processors to:
performing a matching process on objects of data in the central system to identify identical objects in the central system; and
mapping object identifications of the identical objects to each other.

22. The computer program product of claim 20, further comprising instructions operable to cause the one or more programmable processors to:
cleanse the data to standardize content of the data.

23. The computer program product of claim 20, wherein the instructions operable to cause one or more programmable processors to provide the object mapping information to a process includes instructions operable to cause the one or more programmable processors to provide the object mapping information to a data warehouse for system-wide reporting.

24. The computer program product of claim 20, further comprising instructions operable to cause the one or more programmable processors to:
perform analysis based on the object mapping information.

25. The computer program product of claim 21, further comprising instructions operable to cause the one or more programmable processors to:
determine that the identical objects are duplicate objects from a same client system; and
remove duplicate objects from at least one of the central system and the one or more client systems.

26. The computer program product of claim 20, wherein the instructions operable to cause one or more programmable processors to perform a matching process includes instructions operable to cause the one or more programmable processors to identify attributes of the objects in the central system and compare the attributes of the objects to determine if the objects are similar.

27. The computer program product of claim 20, further comprising instructions operable to cause the one or more programmable processors to:
  store object information in the central system, the object information including global attributes of objects and object mapping information for each object, the object information being based on the received data or created in the central system; and
  distribute the objects with object mapping information to the one or more client systems.

28. The computer program product of claim 27, further comprising instructions operable to cause the one or more programmable processors to:
  perform the matching process on object information stored in the central system, the matching process being performed multiple times.

29. The computer program product of claim 27, further comprising instructions operable to cause the one or more programmable processors to:
  update the object information stored in the central system based on data received from the one or more client systems.

30. The computer program product of claim 29, wherein the instructions operable to cause one or more programmable processors to update the object information includes instructions operable to cause the one or more programmable processors to update object mapping information for each object.

31. The computer program product of claim 27, further comprising instructions operable to cause the one or more programmable processors to:
  create objects in the central system to include global attributes for the object.

32. The computer program product of claim 27, wherein the instructions operable to cause one or more programmable processors to distribute the objects includes instructions operable to cause the one or more programmable processors to: distribute the global attributes for each object; and
  complete object information for at least one object in one of the one or more client systems.

33. The computer program product of claim 27, further comprising instructions operable to cause the one or more programmable processors to:
  map the data objects according to industry specific standards.

34. The computer program product of claim 27, further comprising instructions operable to cause the one or more programmable processors to:
  distribute a framework to configure client system software to receive data objects from the central system.

* * * * *